(12) United States Patent
Bart et al.

(10) Patent No.: US 7,661,928 B2
(45) Date of Patent: Feb. 16, 2010

(54) DEVICE FOR ROTATIONALLY LOCKING A CLAMPING NUT FOR A COMPONENT ON A SHAFT, CLAMPING NUT AND SHAFT COMPRISING IT, AND AIRCRAFT ENGINE EQUIPPED THEREWITH

(75) Inventors: Jacques Rene Bart, Verrieres le Buisson (FR); Laurent Michel Andre Berbiguier, Fontainebleau (FR)

(73) Assignee: Snecma, Paris (FR)

( * ) Notice: Subject to any disclaimer, the term of this patent is extended or adjusted under 35 U.S.C. 154(b) by 520 days.

(21) Appl. No.: 11/425,540

(22) Filed: Jun. 21, 2006

(65) Prior Publication Data

US 2006/0291953 A1   Dec. 28, 2006

(30) Foreign Application Priority Data

Jun. 24, 2005   (FR)   ................... 05 51748

(51) Int. Cl.
 *F16B 39/06*   (2006.01)
(52) U.S. Cl. ...................... 415/232; 411/321
(58) Field of Classification Search ................ 415/142; 416/218, 245 A, 244 B; 403/202, 350, 356, 403/319; 411/221, 321, 216; 384/281, 540
See application file for complete search history.

(56) References Cited

U.S. PATENT DOCUMENTS

| 3,541,624 | A | 11/1970 | Suan |
| 4,037,980 | A * | 7/1977 | Haentjens .................... 403/336 |
| 4,046,430 | A | 9/1977 | Buono et al. |
| 4,175,803 | A | 11/1979 | Roberts |
| 4,884,903 | A | 12/1989 | Pham et al. |
| 2003/0044097 | A1 | 3/2003 | Trapp et al. |

FOREIGN PATENT DOCUMENTS

DE            24 39 448 A1    3/1976

* cited by examiner

*Primary Examiner*—Richard Edgar
(74) *Attorney, Agent, or Firm*—Oblon, Spivak, McClelland, Maier & Neustadt, L.L.P.

(57) ABSTRACT

The device for rotationally locking a clamping nut for a component on an end of a hollow shaft, said clamping nut being screwed inside said shaft and having a free end, comprising: at least one shaft cutout on the radially inner periphery of said end of the shaft, at least one nut cutout on the radially outer periphery of an end of said clamping nut, and a locking plug intended to be placed in a locking hole formed by bringing a shaft cutout into coincidence with a nut cutout.

20 Claims, 5 Drawing Sheets

DEVICE FOR ROTATIONALLY LOCKING A CLAMPING NUT FOR A COMPONENT ON A SHAFT, CLAMPING NUT AND SHAFT COMPRISING IT, AND AIRCRAFT ENGINE EQUIPPED THEREWITH

BACKGROUND OF THE INVENTION

The present invention relates to the technical field of maintaining a component inside an end of a hollow shaft or of a journal of a turbomachine such as an aircraft engine, said component possibly being a bearing outer race.

More specifically, the invention relates to a device for rotationally locking a clamping nut for a component on an end of a hollow shaft.

The invention also relates to a clamping nut designed to be able to be locked against rotation by such a rotation-locking device.

The invention further relates to a hollow shaft of a turbomachine intended to cooperate with such a clamping nut.

The invention finally relates to an aircraft engine equipped with such a rotation-locking device and/or with such a clamping nut and/or with such a hollow shaft.

Throughout the text which follows, the term "axial" refers to the axial direction of the turbomachine.

DESCRIPTION OF THE PRIOR ART

FIG. 1, which represents a configuration of the prior art, depicts a hollow shaft 102 of a high pressure turbine of a turbomachine such as an aircraft engine, a bearing outer race 104 fitted to the inside of this shaft 102, and a nut 106 for clamping this bearing outer race 104.

The clamping nut 106 is screwed inside the shaft 102 and comes to bear against the bearing outer race 104 in order to keep it in place.

The free end 108 of the clamping nut 106 protrudes axially from the end of the shaft 102 and comprises tightening slots, which are recesses in which it is possible to slide a tool in order to screw in the clamping nut 106.

The clamping nut 106 is equipped with a rotation-locking device 110, 112, 114 comprising an antirotation snap ring 110 housed in a groove 112 in the clamping nut 106, this groove 112 opening radially to the inside of the clamping nut 106. Situated on either side of the groove 112 are portions 114 of the clamping nut 106 that are in relief, these portions having an irregular surface and sharp edges.

An oil circulation duct 116 is provided across the clamping nut 106 so as to allow a supply of oil between the shaft 102 and the bearing outer race 104.

The end of the shaft 102 of the high pressure turbine is situated opposite an end of a shaft 118 of a low pressure turbine (represented schematically on the right of FIG. 1). The axial distance between the high pressure turbine shaft 102 and the low pressure turbine shaft 118 is denoted by the reference 120.

The configuration which has just been described has a number of disadvantages.

A first disadvantage results from the fact that during the operation of the turbomachine, the high pressure turbine shaft 102 and the low pressure turbine shaft 118 are subject to respective displacements independent of one another and to expansions due to heat. This results in relative displacements, particularly in the axial direction, between the high pressure turbine shaft 102 and the low pressure turbine shaft 118. In order to avoid the risks of collision between the high pressure turbine shaft 102 and the low pressure turbine shaft 118, it is desirable for the distance 120 between the shaft 102 and the shaft 118 to be as large as possible while at the same time affording the smallest possible space requirement for the turbomachine.

A second disadvantage results from the fact that when the nut is intended to keep a bearing outer race in place, the edges of the clamping nut 106 present on the portions 114 thereof which are in relief constitute irregularities of shape which can damage the rolling elements of the bearing when these are assembled subsequent to the assembly of the clamping nut, with the consequence of reducing the service life of the rolling elements.

Consequently there is a need to have available a clamping nut for a component, especially an outer bearing race of a high pressure turbine shaft, which is equipped with a locking device which opposes any rotation of the clamping nut and which is compatible with a large relative axial displacement between the high pressure turbine shaft and the low pressure turbine shaft while at the same time minimizing the axial space requirement for these components.

Furthermore, it is desirable for the clamping nut not to damage the bearing components during their assembly.

SUMMARY OF THE INVENTION

The invention proposes to overcome the disadvantages mentioned above.

According to a first aspect, the invention relates to a device for rotationally locking a clamping nut for a component, especially a bearing outer race, on an end of a hollow shaft having an axial direction, said clamping nut being screwed inside said shaft, and said clamping nut having an end in contact with said component and a free end.

This locking device comprises:
- at least one shaft cutout on the radially outer periphery of said end of the shaft,
- at least one nut cutout on the radially inner periphery of an end of said clamping nut, and
- a locking plug intended to be placed in a locking hole formed by bringing a shaft cutout into coincidence with a nut cutout.

Preferably, the rotation-locking device comprises an odd number of shaft cutouts and an even number of nut cutouts.

Preferably, the rotation-locking device additionally comprises a retention ring for retaining said locking plug in an axial direction.

Preferably, the retention ring additionally comprises at least one retention lug extending radially inward, the number of retention lugs being identical to the number of shaft cutouts.

Preferably, said retention ring has indentations which open radially inward, each indentation being situated between two successive retention lugs.

Preferably, said rotation-locking device comprises a finger on said retention ring and a notch in the shaft, which cooperate to prevent axial rotation of said retention ring.

Preferably, said notch is situated opposite a shaft cutout in an axially projecting end rim of the shaft.

Preferably, said finger extends radially outward opposite one of said locking lugs.

Preferably, said retention ring is equipped with an assembly gap.

Preferably, said assembly gap and said finger are positioned in a diametrically opposed manner on said retention ring.

Preferably, the rotation-locking device additionally comprises a locating groove for locating said retention ring, this groove being formed on a radially inner end face of the shaft.

According to a second aspect, the invention relates to a nut for clamping a component inside an end of a hollow shaft, said nut having an end in contact with said bearing outer race and a free end, wherein the nut is designed to be able to be locked against rotation by a rotation-locking device according to the first aspect of the invention, and wherein the nut comprises at least one nut cutout on the radially inner periphery of its free end.

According to one embodiment, said clamping nut additionally comprises a radially inner face which is substantially smooth and which flares out in the direction of its free end.

According to a third aspect, the invention relates to a hollow shaft intended to cooperate with a clamping nut for maintaining a component inside one of its ends, wherein the shaft is designed to be able to be locked against rotation by a rotation-locking device according to the second aspect of the invention, and wherein the shaft comprises at least one shaft cutout on the radially outer periphery of said end of said shaft, and a locating groove formed on an inner face of an end rim of said shaft.

Finally, according to a fourth aspect, the invention relates to an aircraft engine equipped with at least one rotation-locking device according to the first aspect and/or with at least one clamping nut according to the second aspect and/or with at least one hollow shaft according to the third aspect.

BRIEF DESCRIPTION OF THE DRAWINGS

The invention will be better understood on reading the detailed description which will follow of embodiments of the invention, which are given by way of nonlimiting illustration, with reference to the appended drawings, in which.

DESCRIPTION OF THE PREFERRED EMBODIMENTS

Figure 2:
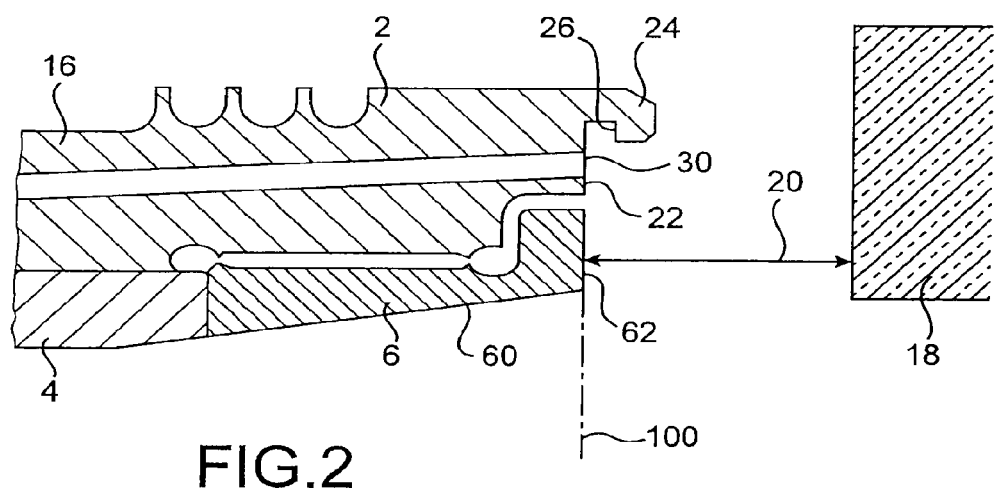
FIG. 2 illustrates, in axial section, a clamping nut arrangement according to the invention.
Figure 3:
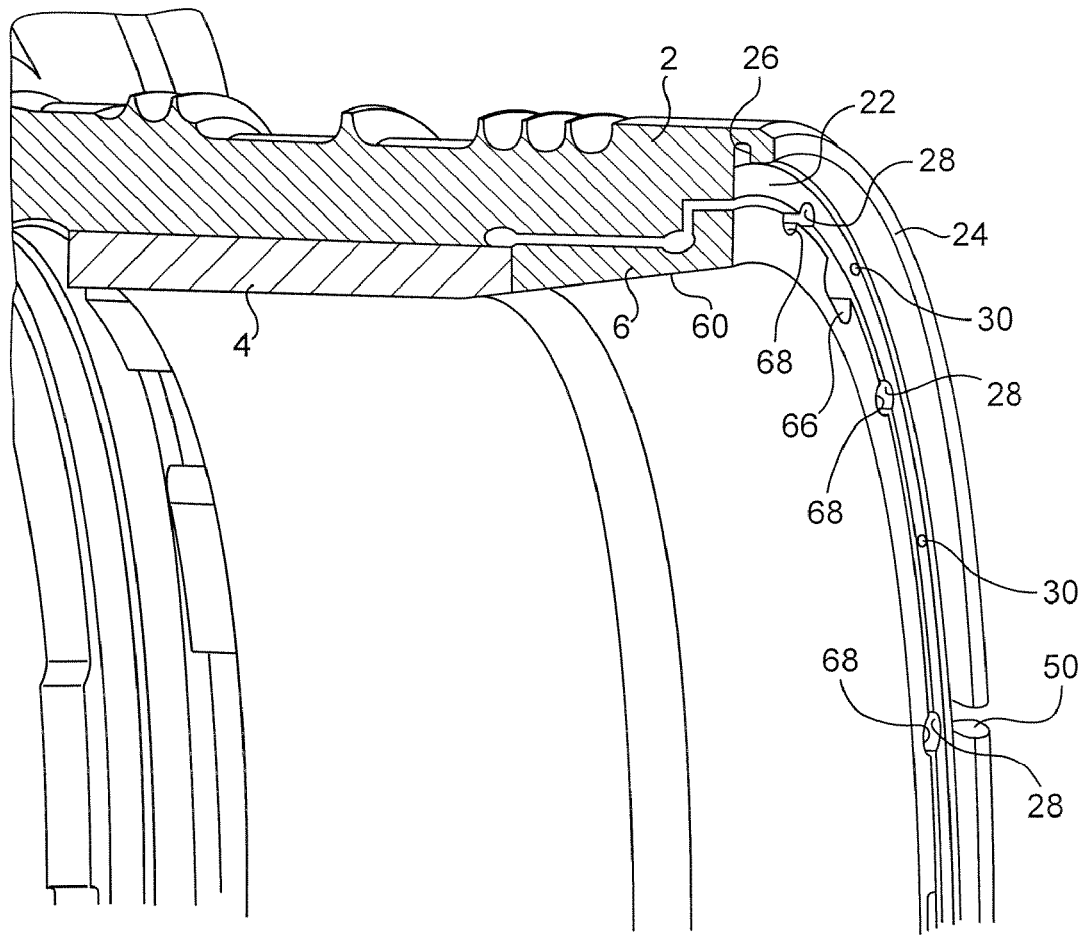
FIG. 3 is a perspective and partially cut-away illustration of the clamping nut arrangement according to the invention.
Figure 4:
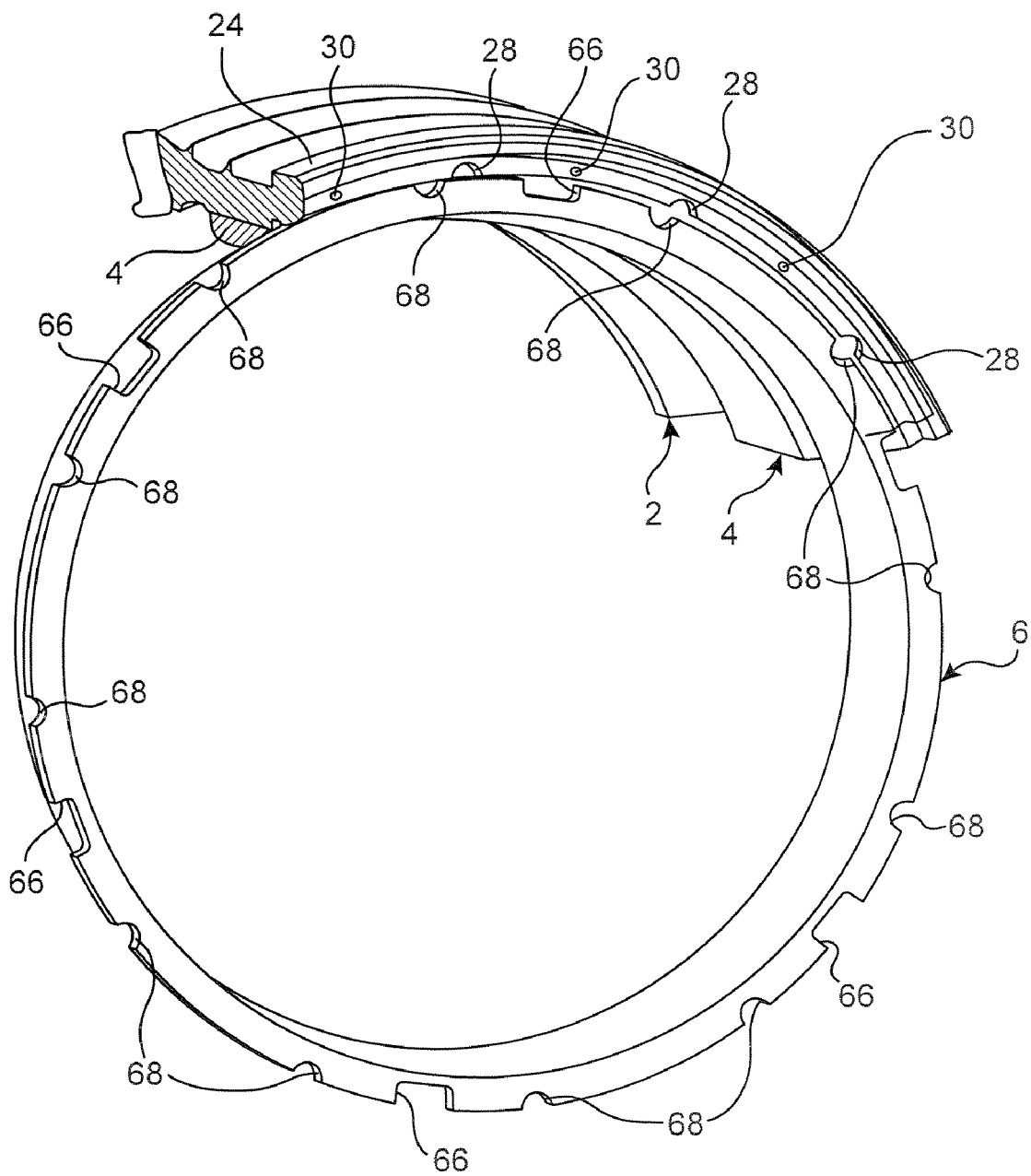
FIG. 4 is a perspective and partially cut-away illustration of one step of implementing the antirotation means of the clamping nut.

With reference first of all to FIGS. 2 and 3, a hollow shaft 2 of a turbine of a turbomachine is represented. Arranged within this hollow shaft 2 is a bearing outer race 4, which is introduced through a free end of the hollow shaft 2. The bearing outer race 4 is kept in place by means of a clamping nut 6, which is introduced after it through the end of the hollow shaft 2 and which keeps it in place. For this purpose, the clamping nut 6 is provided with an external thread which cooperates with an internal thread of the hollow shaft 2.

The clamping nut 6 has an end which is in contact with the bearing outer race, and a free end.

The references 22 and 62 respectively denote a free end face of the hollow shaft 2 and a free end face of the clamping nut 6, these respective two end faces 22, 62 being substantially contained in the same radial end plane 100 (see FIG. 2).

The designation 20 denotes the axial distance which separates this radial end plane 100 from a shaft 18 of a low pressure turbine (represented schematically on the right of FIG. 2).

The hollow shaft 2 comprises a shaft rim 24 which extends axially from the end face 22 and in which there is formed, substantially plumb with the radial plane 100, a groove 26 which opens radially to the inside of the shaft 2.

The hollow shaft 2 comprises shaft cutouts 28 which are distributed over its radially inner periphery and which also open onto its end face 22.

The hollow shaft 2 is traversed by oil passages 16 which allow a return circulation of oil between the bearing outer race 4 and the end face 22 of the shaft 2 and which emerge at this end face 22 by way of orifices 30.

The clamping nut 6 comprises a collar 64 which extends radially outward and which is terminated by its end face 62.

The clamping nut 6 comprises tightening slots 66, which are depressions distributed over the radially outer periphery of the collar 64 and which also open onto its end face 62.

The clamping nut 6 comprises nut cutouts 68 which are distributed over the radially outer periphery of the collar 64 and which also open onto its end face 62.

The end faces 22 and 62 of the shaft 2 and of the clamping nut 6, as well as the tightening slots 66 the nut cutouts 68, the shaft cutouts 28 and the oil passages 30 are particularly visible in FIG. 3, which is a front perspective view showing the clamping nut 6 and a portion of the hollow shaft 2. In the example illustrated in the figures, the clamping nut comprises six tightening slots 66 and twelve nut cutouts 68, while the shaft 2 comprises thirteen shaft cutouts 28.

The device for rotationally locking the clamping nut 6 comprises the shaft cutouts 28 and the nut cutouts 68. It also comprises a locking plug 8. In order to lock the clamping nut 6 against rotation, the latter is turned with respect to the hollow shaft 2 until one of the nut cutouts 68 is in coincidence with one of the shaft cutouts 28. The two cutouts 68, 28 thus brought into coincidence form a locking hole 682 into which the locking plug 8 is introduced.

Figure 5:
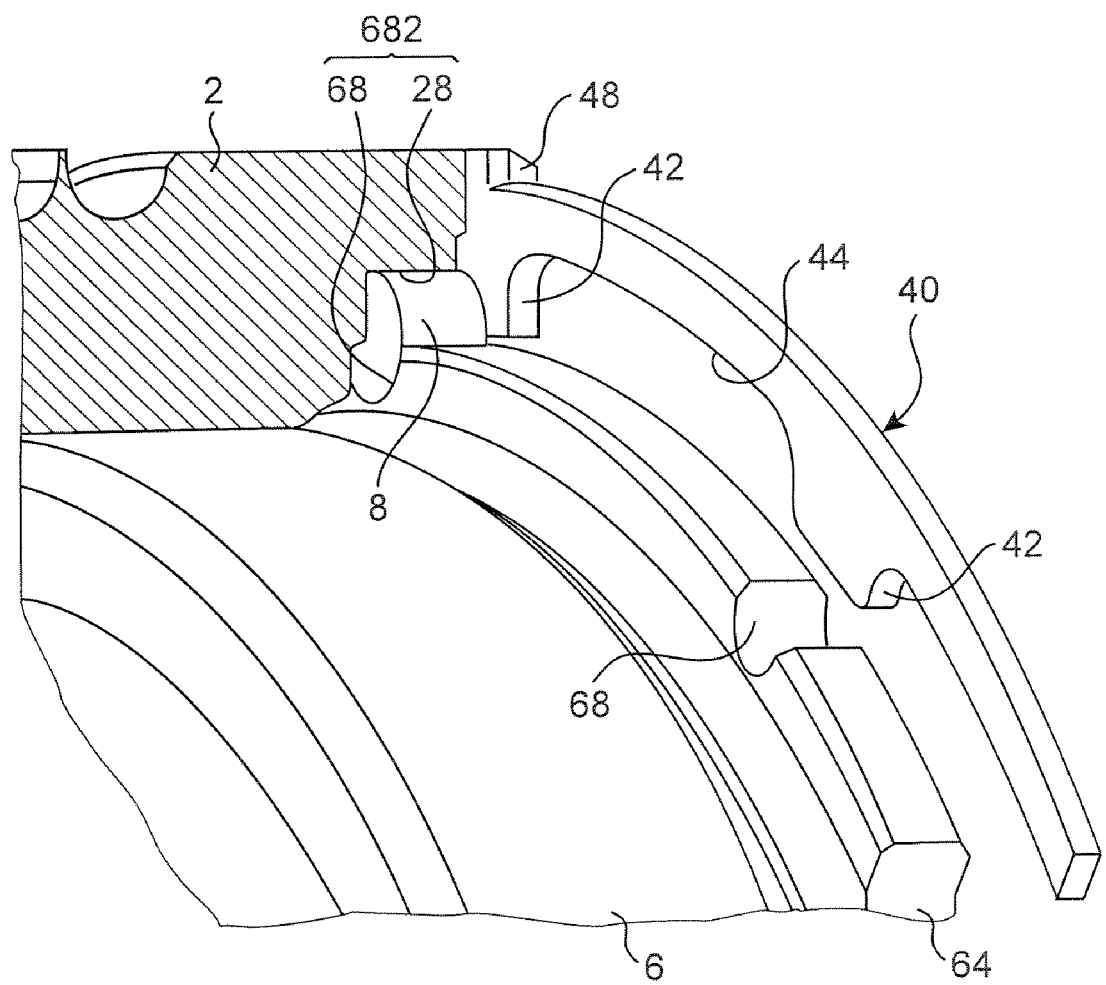
FIG. 5 is a perspective and partially cut-away illustration of another step of implementing the antirotation means of the clamping nut.

FIG. 5 illustrates, in an enlarged view, the locking of the clamping nut 6 against rotation. It shows a portion of the clamping nut 6 and a portion of the hollow shaft 2 in the region of a locking hole 682 into which a locking plug 8 is inserted. In the example illustrated, the shaft cutouts 28 and the nut cutouts 68 have a circular contour, with the result that the locking hole 682 has a circular cross section. The locking plug 8 likewise has a circular cross section.

The device for rotationally locking the clamping nut 6 also preferably comprises a retention ring 40, which retains the locking plug 8 in the axial direction after this locking plug has been introduced into the locking hole 682. The axial retention ring 40 is likewise represented in FIG. 5.

The rotation-locking device also comprises the groove 26 of the hollow shaft 2, which is a locating groove for the retention ring 40. The diameter of the retention ring 40 and the depth of the locating groove 26 are determined in such a way as to allow the retention ring 40 to be inserted into and maintained in the groove 26.

The retention ring 40 has retention lugs 42 which extend radially inward. These retention lugs 42 are distributed over its circumference and their number is equal to the number of shaft cutouts 28 such that, for a particular angular position of the retention ring 40 in the locating groove 26, each retention lug 42 covers a shaft cutout 68. Between the retention lugs 42, the retention ring 40 has indentations 44 which open radially inward.

Figure 6:
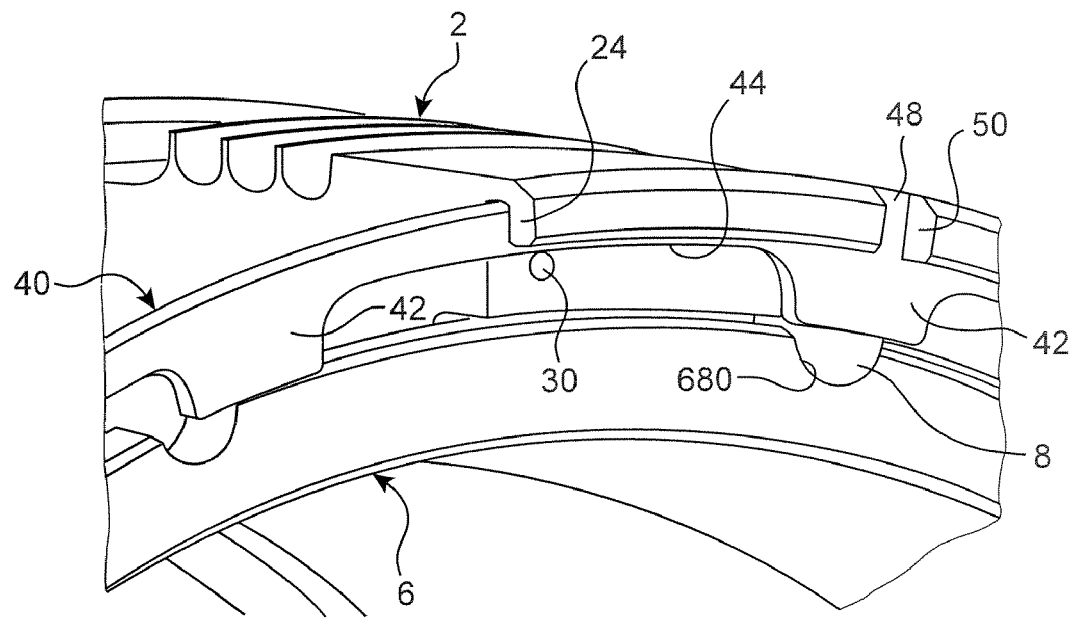
FIGS. 6 and 7 are perspective and partially cut-away illustrations of construction details of the antirotation means of the clamping nut.

As illustrated in FIGS. 5 and 6, the retention ring 40 additionally comprises a finger 48 which extends radially outward from its outer periphery. In addition, the rim 24 of the shaft 2 is interrupted by a notch 50 situated opposite one 280 of the shaft cutouts 28.

Consequently, to obtain rotational locking of the clamping nut 6 with respect to the hollow shaft 2, the clamping nut 6 is turned until the shaft cutout 280 opposite which the notch 50 is situated comes into coincidence with one 680 of the nut cutouts 68. A locking plug 8 is then introduced into the locking hole 682 formed by bringing this shaft cutout 280 into coincidence with this nut cutout 680. The retention ring 40 is then introduced into the locating groove 26 and is positioned in such a way that the finger 48 is inserted into the notch 50.

Hence, the retention ring 40 is immobilized rotationally with respect to the shaft 2, and thus with respect to the locking hole 682 into which the locking plug 8 has been placed. This locking plug 8 is retained axially by one of the retention lugs 42 of the retention ring 40. It is not possible for this locking plug 8 to escape from the locking hole 682. The presence of the locking plug 8 prevents the clamping nut 6 from rotating with respect to the shaft 2.

Figure 7:
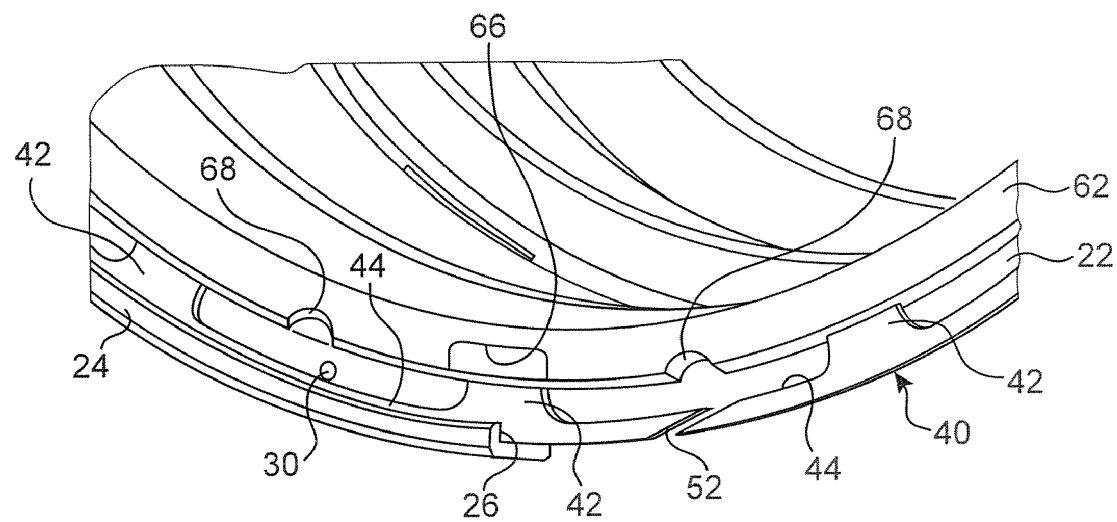

As illustrated in FIG. 7, the retention ring 40 additionally comprises an assembly gap 52 which makes it possible to open the retention ring 40 in order to deform it and temporarily reduce its diameter so that it can be introduced into the locating groove 26. Preferably, the assembly gap 52 is positioned on the retention ring 40 so as to be diametrically opposed to the finger 48.

An advantage of the configuration of the retention ring 40 according to the invention lies in the fact that the presence of the indentations 44 allows the orifices 30 of the oil passages 16 to remain uncovered when the rotation-locking device is installed. This device therefore does not disturb the return of oil from the bearing race 4.

The clamping nut 6 additionally has a radially inner face 60 which is smooth and which flares out in the direction of its free end. In other words, the clamping nut has a conical opening. This particular geometry of the clamping nut 6 prevents the complementary bearing elements of the outer bearing race 4 from catching or being damaged during their assembly.

Figure 1:
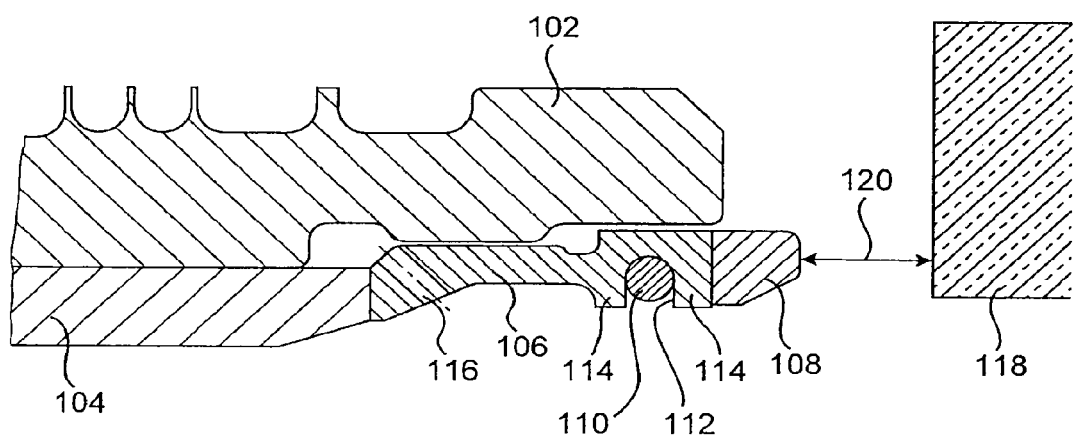
FIG. 1, already described, illustrates, in axial section, a clamping nut arrangement for a high pressure turbine shaft according to the prior art.

The rotation-locking device according to the invention has a major advantage over those devices of the prior art which have been discussed above. Specifically, as is apparent from a comparison of FIGS. 1 and 2, the distance 20 between the high pressure turbine shaft 2 and the low pressure turbine shaft 18 according to the invention is greater than the distance 120 between the high pressure turbine shaft 102 and the low pressure turbine shaft 118 according to the prior art.

The configuration of the locking device according to the invention consequently allows larger axial displacements of the shafts than the prior art.

The invention is not limited to the embodiment which has just been described.

Without departing from the scope of the invention, it would be possible to envision the hollow shaft having a different number of shaft cutouts than thirteen and the clamping nut having a different number of nut cutouts than twelve. Nevertheless, it is necessary for the number of shaft cutouts and the number of nut cutouts to differ from one another. Preferably, one of these numbers is an even number and the other of these numbers is an odd number.

Without departing from the scope of the invention, it would be possible to envision the shaft cutouts and the nut cutouts having a different shape than a circular shape and the locking plug having a shape which is complementary to that of the locking hole formed by bringing one of the shaft holes into coincidence with one of the nut holes.

The invention which has just been described in the detailed description which precedes illustrates a device for rotationally locking a clamping nut for a bearing outer race. It would be possible for the invention to apply to a component, other than a bearing outer race, which is to be kept in place by a clamping nut inside a hollow shaft, in the vicinity of an end of this shaft.

The invention claimed is:

1. A device for rotationally locking a clamping nut for a bearing outer race, on an end of a hollow shaft having an axial direction, said clamping nut being screwed inside said shaft, and said clamping nut having a first end in contact with said bearing outer race and a second end which is free, wherein the device comprises:
    at least one shaft cutout disposed on the radially inner periphery of said end of the shaft;
    at least one nut cutout disposed on the radially outer periphery of an end of said clamping nut; and
    a locking plug configured to be placed in a locking hole, said locking hole formed by bringing the at least one shaft cutout into coincidence with the at least one nut cutout,
    wherein said clamping nut includes a radially inner face which is substantially smooth and flares out in a direction towards the second end such that an inner radius at the second end of said clamping nut is greater than an inner radius at the first end of said clamping nut.

2. The rotation-locking device as claimed in claim 1, which comprises an odd number of shaft cutouts and an even number of nut cutouts.

3. The rotation-locking device as claimed in claim 2, which comprises thirteen shaft cutouts and twelve nut cutouts.

4. A nut for clamping a component inside an end of a hollow shaft, said clamping nut having an end in contact with said component and a free end, wherein the nut is configured to be locked against rotation by a rotation-locking device as claimed in claim 1, and
    wherein the nut comprises at least one nut cutout on the radially outer periphery of its free end.

5. The clamping nut as claimed in claim 4, which additionally comprises a radially inner face which is substantially smooth and which flares out in the direction of its free end.

6. An aircraft engine which is equipped with a clamping nut as claimed in claim 4.

7. A hollow shaft configured to cooperate with a clamping nut for maintaining a component inside one of its ends, wherein the shaft is designed to be able to be locked against rotation by a rotation-locking device as claimed in claim 1, and
    wherein the shaft comprises at least one shaft cutout on the radially inner periphery of said end of said shaft, and a locating groove disposed on an inner face of an end rim of said shaft.

8. An aircraft engine which is equipped with a hollow shaft as claimed in claim 7.

9. An aircraft engine which is equipped with a rotation-locking device as claimed in claim 1.

10. The rotation-locking device as claimed in claim 1, wherein said clamping nut includes at least one tightening slot disposed on the outer periphery end.

11. The rotation-locking device as claimed in claim 1, wherein said shaft includes at least one oil passage configured to circulate oil between the bearing outer race and an end face of said shaft.

12. A device for rotationally locking a clamping nut for a bearing outer race, on an end of a hollow shaft having an axial direction, said clamping nut being screwed inside said shaft, and said clamping nut having a first end in contact with said component and a second end which is free, wherein the device comprises:
- at least one shaft cutout disposed on the radially inner periphery of said end of the shaft;
- at least one nut cutout disposed on the radially outer periphery of an end of said clamping nut; and
- a locking plug configured to be placed in a locking hole, said locking hole formed by bringing the at least one shaft cutout into coincidence with the at least one nut cutout; and
- a retention ring configured to retain said locking plug in an axial direction.

13. The rotation-locking device as claimed in claim 12, wherein the retention ring comprises at least one retention lug extending radially inward, the number of retention lugs being identical to the number of shaft cutouts.

14. The rotation-locking device as claimed in claim 13, wherein said retention ring has indentations which open radially inward, each indentation being situated between two successive retention lugs.

15. The rotation-locking device as claimed in claim 12, further comprising a finger on said retention ring and a notch in the shaft, said finger and said notch cooperating to prevent rotation of said retention ring.

16. The rotation-locking device as claimed in claim 15, wherein said notch is situated opposite a shaft cutout in an axially projecting end rim of the shaft.

17. The rotation-locking device as claimed in claim 16, wherein said finger extends radially outward opposite one of said locking plugs.

18. The rotation-locking device as claimed in claim 17, wherein said retention ring includes an assembly gap.

19. The rotation-locking device as claimed in claim 18, wherein said assembly gap and said finger are positioned in a diametrically opposed manner on said retention ring.

20. The rotation-locking device as claimed in claim 12, further comprising a locating groove for locating said retention ring, said groove being disposed on a radially inner end face of the shaft.

* * * * *